(12) United States Patent
Hart et al.

(10) Patent No.: US 11,604,258 B2
(45) Date of Patent: Mar. 14, 2023

(54) LIDAR SYSTEM

(71) Applicant: GM GLOBAL TECHNOLOGY OPERATIONS LLC, Detroit, MI (US)

(72) Inventors: Nathaniel W. Hart, Beverly Hills, MI (US); Michelle M. Clem, Saint Clair, MI (US); Adam L. Wright, Livonia, MI (US); Tzvi Philipp, Bet Shemesh (IL)

(73) Assignee: GM Global Technology Operations LLC, Detroit, MI (US)

( * ) Notice: Subject to any disclaimer, the term of this patent is extended or adjusted under 35 U.S.C. 154(b) by 587 days.

(21) Appl. No.: 16/746,185

(22) Filed: Jan. 17, 2020

(65) Prior Publication Data
US 2021/0223366 A1    Jul. 22, 2021

(51) Int. Cl.
| | | |
|---|---|---|
| *G01S 7/48* | (2006.01) | |
| *G01S 7/481* | (2006.01) | |
| *G01S 17/931* | (2020.01) | |
| *G01S 17/10* | (2020.01) | |
| *G01S 17/42* | (2006.01) | |
| *G01S 17/89* | (2020.01) | |

(52) U.S. Cl.
CPC .......... *G01S 7/4814* (2013.01); *G01S 7/4816* (2013.01); *G01S 17/10* (2013.01); *G01S 17/42* (2013.01); *G01S 17/89* (2013.01); *G01S 17/931* (2020.01)

(58) Field of Classification Search
CPC ...... G01S 7/4814; G01S 7/4816; G01S 17/10; G01S 17/42; G01S 17/89; G01S 17/931
See application file for complete search history.

(56) References Cited

U.S. PATENT DOCUMENTS

2021/0382151 A1* 12/2021 McCord ................ G01S 7/4817

* cited by examiner

*Primary Examiner* — Kevin K Pyo
(74) *Attorney, Agent, or Firm* — Quinn IP Law

(57) ABSTRACT

A system including a light detection and ranging (LiDAR) sensor is arranged to monitor a field of view, and includes a LiDAR sensor and a linear resonant actuator. The LiDAR sensor includes a first portion including a laser array and a detector array, and a second portion including a transmitting lens and a receiving lens. The linear resonant actuator is arranged to oscillate one of the first portion or the second portion of the LiDAR sensor.

18 Claims, 3 Drawing Sheets

LIDAR SYSTEM

INTRODUCTION

Light-detection and ranging (LiDAR) is an optical remote sensing technology that operates to acquire positional information of objects in a surrounding environment employing a light emitter and a light sensor. Operation of a LiDAR system includes illuminating objects in the surrounding environment with light pulses emitted from a light emitter, detecting light scattered by the objects using a light sensor such as a photodiode, and determining range of the objects based on the scattered light. The travel time of the light pulses to the photodiode can be measured, and a distance to an object can then be derived from the measured time. Detection and positional information related to objects in a surrounding environment may be enhanced by increased resolution of the LiDAR system.

SUMMARY

A system including a light detection and ranging (LiDAR) sensor is arranged to monitor a field of view, and includes a LiDAR sensor and a linear resonant actuator. The LiDAR sensor includes a first portion including a laser array and a detector array, and a second portion including a transmitting lens and a receiving lens. The linear resonant actuator is arranged to oscillate one of the first portion or the second portion of the LiDAR sensor.

An aspect of the disclosure includes the linear resonant actuator being arranged to mechanically laterally oscillate one of the first portion or the second portion of the LiDAR sensor.

Another aspect of the disclosure includes the linear resonant actuator being arranged to mechanically laterally oscillate the first portion of the LiDAR sensor including the laser array and the detector array.

Another aspect of the disclosure includes a mounting frame and a position sensor, wherein the position sensor is arranged to monitor a lateral position of the first portion of the LiDAR sensor in relation to the mounting frame.

Another aspect of the disclosure includes the linear resonant actuator being arranged to mechanically laterally oscillate the second portion of the LiDAR sensor including the transmitting lens and the receiving lens.

Another aspect of the disclosure includes the mounting frame and the position sensor, wherein the position sensor is arranged to monitor a lateral position of the second portion of the LiDAR sensor in relation to the mounting frame.

Another aspect of the disclosure includes a slide bearing, wherein the one of the first portion or the second portion of the LiDAR sensor is disposed thereon.

Another aspect of the disclosure includes the LiDAR sensor being arranged to monitor the field of view in a longitudinal direction and an attitudinal direction proximal to the LiDAR sensor, wherein the linear resonant actuator is arranged to mechanically oscillate one of the first portion or the second portion of the LiDAR sensor in a lateral direction that is orthogonal to the longitudinal direction and the attitudinal direction.

Another aspect of the disclosure includes the linear resonant actuator including a first linear resonant actuator that is arranged to oscillate the first portion including the laser array and the detector array of the LiDAR sensor in a lateral direction. The system further includes a second linear resonant actuator, wherein the second linear resonant actuator is arranged to oscillate the second portion including the transmitting lens and the receiving lens in an attitudinal direction.

Another aspect of the disclosure includes the LiDAR sensor being arranged on a vehicle to monitor the field of view in a longitudinal direction and an attitudinal direction proximal to the vehicle. The resonant actuator is arranged to oscillate the first portion of the LiDAR sensor in a lateral direction and an attitudinal direction.

Another aspect of the disclosure includes the LiDAR sensor being arranged on the vehicle to monitor the field of view in a longitudinal direction and an attitudinal direction proximal to the vehicle, wherein the resonant actuator is arranged to mechanically oscillate one of the first portion or the second portion of the LiDAR sensor in a lateral direction that is orthogonal to the longitudinal direction and the attitudinal direction.

Another aspect of the disclosure includes the resonant actuator being a first resonant actuator that is arranged to mechanically oscillate the first portion including the laser array and the detector array of the LiDAR sensor in a lateral direction during operation. The system further includes a second resonant actuator that is arranged to mechanically oscillate the second portion including the transmitting lens and the receiving lens in an attitudinal direction during operation.

Another aspect of the disclosure includes the LiDAR sensor being arranged on the vehicle to monitor the field of view in a longitudinal direction and an attitudinal direction proximal to the vehicle. The resonant actuator is arranged to mechanically oscillate the first portion of the LiDAR sensor in a lateral direction and an attitudinal direction during operation.

Another aspect of the disclosure includes a LiDAR system arranged to monitor a field of view, including a LiDAR sensor including a first portion including a single laser and a single detector, and a second portion including a transmitting lens and a receiving lens, and a linear resonant actuator. The linear resonant actuator is arranged to oscillate one of the first portion or the second portion of the LiDAR sensor.

Another aspect of the disclosure includes the linear resonant actuator being arranged to mechanically laterally oscillate the first portion of the LiDAR sensor including the single laser and the single detector.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

Figure 1:
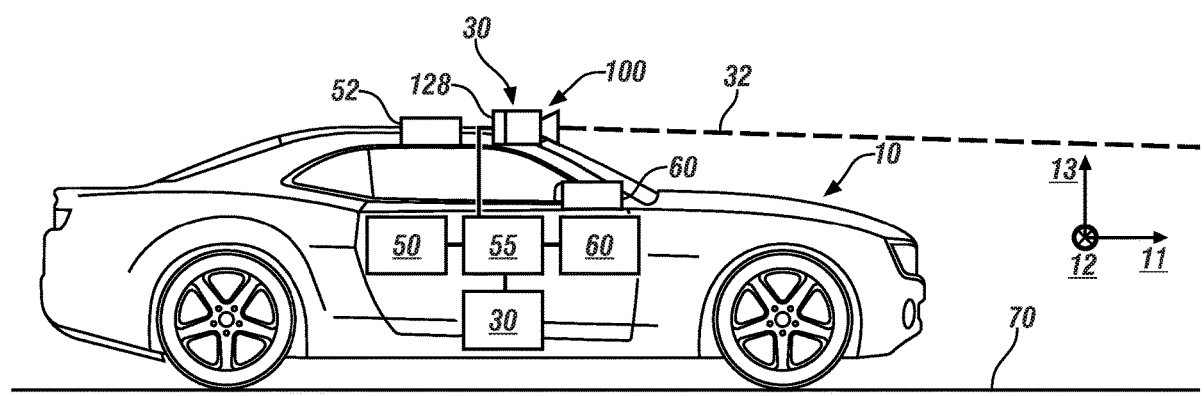
FIG. 1, schematically illustrates an embodiment of a light detection and ranging (LiDAR) system that includes a LiDAR sensor and a linear resonant actuator, wherein the LiDAR system is an element of a spatial monitoring system that is disposed on a vehicle to monitor a field of view, in accordance with the disclosure FIG. 2 schematically illustrates a top view of one embodiment of the LiDAR system, in accordance with the disclosure.

Referring to the drawings, wherein like reference numerals correspond to like or similar components throughout the several Figures, FIG. 1, consistent with embodiments disclosed herein, schematically illustrates an embodiment of a light detection and ranging (LiDAR) system 100 that includes a linear resonant actuator (LRA) 128. In one embodiment, and as described herein, the LiDAR system 100 is an element of a spatial monitoring system 30 including a spatial monitoring controller 55 that is disposed on a vehicle 10. The concepts described herein may be employed on various systems that may benefit from information determined from an embodiment of the LiDAR system 100.

A side-view of the vehicle 10 is shown, which is disposed on and able to traverse a travel surface 70 such as a paved road surface. The vehicle 10 and the travel surface 70 define a three-dimensional coordinate system including a longitudinal axis 11, a lateral axis 12 and an attitudinal axis 13. The longitudinal axis 11 is defined as being equivalent to a direction of travel of the vehicle 10 on the travel surface 70. The lateral axis 12 is defined as being equivalent to orthogonal to the direction of travel of the vehicle 10 on the travel surface 70. The attitudinal axis 13 is defined as being orthogonal to a plane defined by the longitudinal axis 11 and the lateral axis 12, i.e., as projecting perpendicular to the travel surface 70.

The LiDAR system 100 is disposed on the vehicle 10 to monitor a viewable region 32 that is proximal to the vehicle 10. In one embodiment, the viewable region 32 is forward of the vehicle 10. The vehicle 10 may also include a vehicle controller 50, a global navigation satellite system (GNSS) sensor 52, a human/machine interface (HMI) device 60. The LiDAR system 100 employs a pulsed and reflected laser beam to measure range or distance to an object. When employed in combination with information from the GNSS sensor 52, the spatial monitoring controller 55 is able to determine geospatial locations of objects that are in the viewable region 32 of the vehicle 10.

Other on-vehicle systems may include, by way of non-limiting examples, an on-board navigation system, a computer-readable storage device or media (memory) that includes a digitized roadway map, an autonomous control system, an advanced driver assistance system, a telematics controller, etc. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The spatial monitoring system 30 may include other spatial sensors and systems that are arranged to monitor the viewable region 32 forward of the vehicle 10 include, e.g., a surround-view camera, a forward-view camera, and a radar sensor, which may be employed to supplement or complement spatial information that is generated by the LiDAR system 100. Each of the spatial sensors is disposed on-vehicle to monitor all or a portion of the viewable region 32 to detect proximate remote objects such as road features, lane markers, buildings, pedestrians, road signs, traffic control lights and signs, other vehicles, and geographic features that are proximal to the vehicle 10. The spatial monitoring controller 55 generates digital representations of the viewable region 32 based upon data inputs from the spatial sensors. The spatial monitoring controller 55 can evaluate inputs from the spatial sensors to determine a linear range, relative speed, and trajectory of the vehicle 10 in view of each proximate remote object. The spatial sensors can be located at various locations on the vehicle 10, including the front corners, rear corners, rear sides and mid-sides. The spatial sensors can include a front radar sensor and a camera in one embodiment, although the disclosure is not so limited. Placement of the spatial sensors permits the spatial monitoring controller 55 to monitor traffic flow including proximate vehicles, intersections, lane markers, and other objects around the vehicle 10. Data generated by the spatial monitoring controller 55 may be employed by a lane marker detection processor (not shown) to estimate the roadway. As employed herein, the terms "proximate", "proximal" and related terms refer to stationary and mobile objects that are in the vicinity of the vehicle 10 such that they are discernible by one or more of the spatial sensors connected to the spatial monitoring controller 55 including the LiDAR system 100.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which can be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
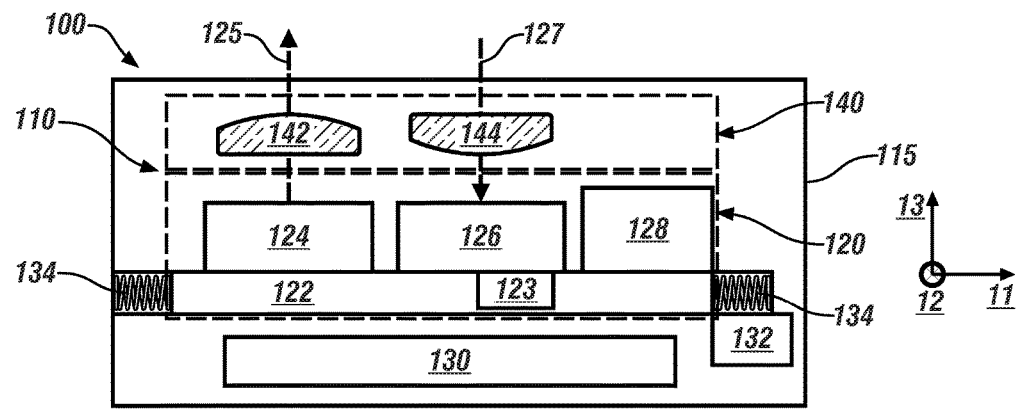

FIG. 2 shows a schematic top view of one embodiment of the LiDAR system 100, wherein orientation of the LiDAR system 100 is defined and described in context of a three-dimensional coordinate system including the longitudinal axis 11, lateral axis 12 and attitudinal axis 13. The LiDAR system 100 includes a lidar sensor 110 including a first portion 120 and a second portion 140, a mounting frame 115, the LRA 128, and a LiDAR controller 123. The first portion 120 and second portion 140 are arranged in a manner that facilitates scanning of the viewable region 32. In this embodiment, the LRA 128 is arranged to mechanically oscillate the first portion 120 in a manner described herein, and the second portion 140 is secured to the mounting frame 115. Alternatively, the LRA 128 can be arranged to mechanically oscillate the second portion 140 in a manner described herein, and the first portion 120 is secured to the mounting frame 115.

Referring again to FIG. 2, the first portion 120 includes a laser array 124 and a detector array 126, both which are disposed on a printed circuit board (PCB) 122, wherein the PCB 122 is arranged to be mechanically oscillated by the LRA 128. The laser array 124 may include, in one embodiment, a plurality of light emitters. The detector array 126 may include, in one embodiment, a plurality of light sensors such as photodiodes. Alternatively, the laser array 124 includes a single light emitter and the detector array includes a single light sensor such as a photodiode, both which are disposed on the PCB 122. The LiDAR controller 123 is disposed on the PCB 122 and provides operational control of the laser array and the LRA 128, and executes signal processing of the detector array 126. The laser array 124 and the detector array 126 are oriented to longitudinally project and receive, respectively, laser light beams. Compression springs 134 are disposed on opposed lateral ends of the PCB 122. The spring constants of the compression springs 134 are selected to achieve a desired scan pattern for the LiDAR system 100. By way of example, the desired scan pattern includes a scan rate that is related to resonant frequency, which is associated with the spring constant. Thus, a high spring constant can be selected to achieve a high resonant frequency to facilitate a high scan rate, whereas a low spring constant can be selected to achieve a low resonant frequency to facilitate a low scan rate. Alternatively, or in addition, an alternating current signal can be employed to control the LRA 128 by controlling its scanning frequency.

In one embodiment, the PCB 122 is disposed on a slide bearing 130, which is laterally oriented, thus enabling and restricting cyclic motion of the PCB 122 in parallel to the lateral axis 12. In one embodiment, the slide bearing 130 is configured as a linear micromotion slide device. Alternatively, the slide bearing 130 may be a hydrostatic bearing, a magnetic bearing, a linear flexure bearing, or another bearing arrangement. A position sensor 132 is disposed on the mounting frame 115 and is arranged to monitor the lateral position of the PCB 122 in relation to the mounting frame 115. The position sensor 132 is employed to measure translation of the PCB 122 and thus the translation of the laser array 124 and the detector array 126 for open loop or closed loop operation to determine a position of a scan angle to build a point cloud related to the sensed information that is generated by the detector array 126 when the first portion 120 is laterally oscillated.

The second portion 140 includes a transmitting lens 142 and a receiving lens 144, wherein the transmitting lens 142 is disposed in a first light path 125 associated with transmitted light from the laser array 124 and the receiving lens 144 is disposed in a second light path 127 associated with reflected light that is directed to the detector array 126.

In one embodiment, the laser array 124 is configured as an indexed vertical-cavity surface-emitting laser (VCSEL) array, and the detector array 126 is configured as a single photon avalanche diode (SPAD) array for increased resolution. This may include, in one embodiment, being configured as an integrated two-dimensional optical phased array (OPA) with a fully integrated beam-steering photonic integrated circuit (PIC). Phased-array optics is the technology of controlling the phase and amplitude of light waves transmitting, reflecting, or received by a two-dimensional surface using adjustable surface elements. An optical phased array (OPA) is the optical analog of a radio wave phased array. By dynamically controlling the optical properties of a surface on a microscopic scale, it is possible to steer the direction of light beams in an OPA transmitter, or the view direction of sensors in an OPA receiver, without moving parts. Phased array beam steering is used for optical switching and multiplexing in optoelectronic devices, and for aiming laser beams. The PIC facilitates integrating, for example, lasers, modulators, detectors, and filters on a single semiconductor, typically silicon or indium phosphide.

In operation, the LRA 128 mechanically laterally oscillates the PCB 122 with the laser array 124 and the detector array 126, with the oscillation being monitored by the position sensor 132. The compression springs 134 may pre-load the PCB 122 to provide a nominal starting position for the oscillation.

Figure 3:
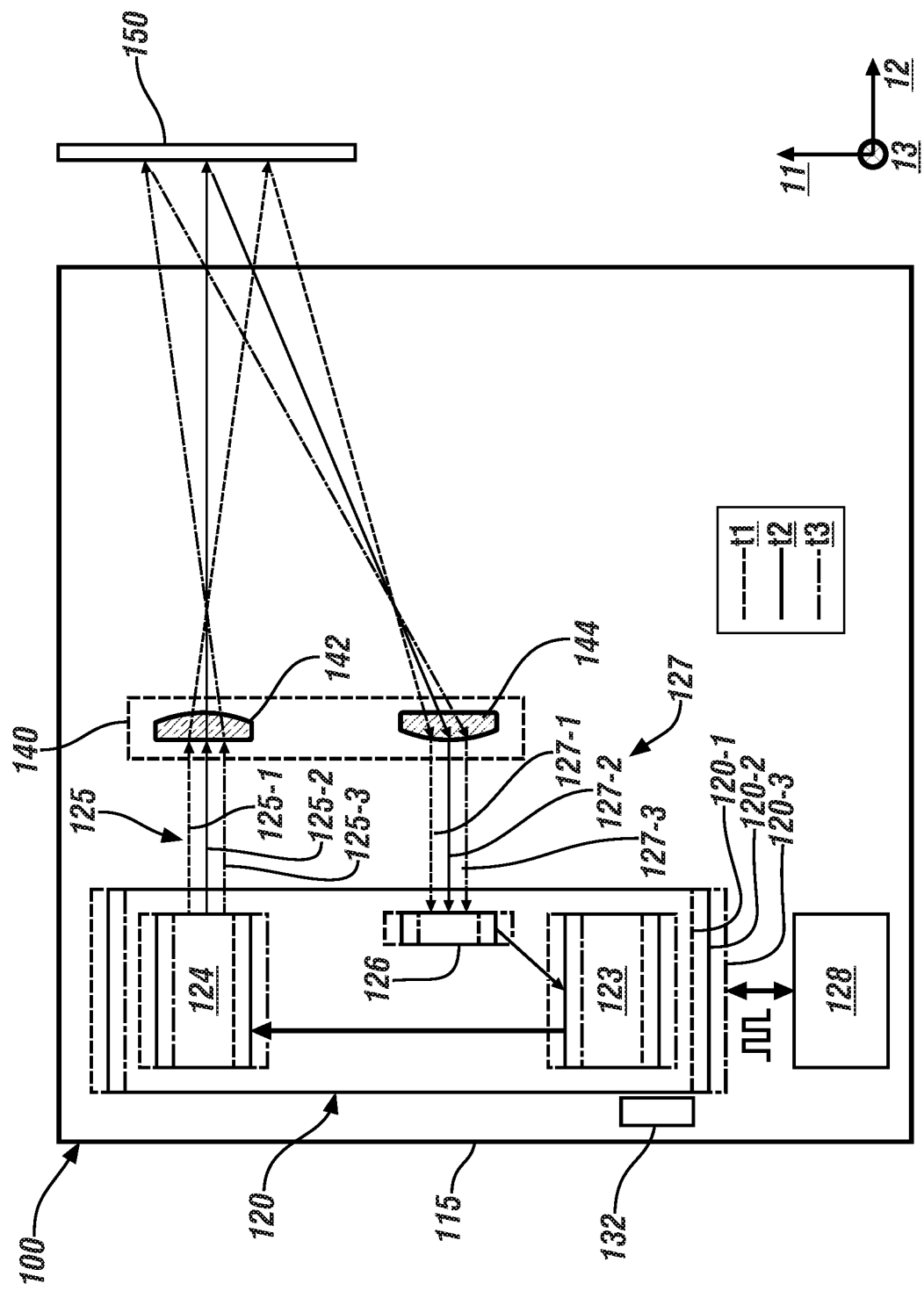
FIG. 3 schematically illustrates the LiDAR system described with reference to FIG. 2, a target that is disposed in a field of view of the LiDAR system, first light paths associated with transmitted light from the laser array, and the second light paths associated with reflected light that is reflected by the target, in accordance with the disclosure.

FIG. 3 schematically shows the LiDAR system 100 of FIG. 2, including the lidar sensor 110 including the mounting frame 115, the LRA 128, and the LiDAR controller 123. The laser array 124, detector array 126, and LRA 128 are mounted on the PCB 122 of the first portion 120, and the transmitting lens 142 and receiving lens 144 of the second portion 140 are attached to the mounting frame 115. Also shown is a target 150 that is disposed in a field of view of the LiDAR system 100, the first light path 125 associated with transmitted light from the laser array 124 that impinges on the target 150, and the second light path 127 associated with reflected light that is reflected by the target 150 in the field of view.

The LRA 128 is arranged and controlled to linearly oscillate the lateral position of the first portion 120, with lateral oscillation of the first portion 120 at times t1, t2, and t3, as indicated by lines 120-1, 120-2, and 120-3, respectively. Light beams generated by the laser array 124 at times t1, t2, and t3, and corresponding to the lateral oscillation of the first portion 120 are indicated by transmitted beams 125-1, 125-2, and 125-3, respectively, which indicate the first light path 125 associated with transmitted light from the laser array 124. Additional lenses, 45 degree transmitting mirrors, beam splitters and other such optical elements may be incorporated into the optical design. Likewise, reflected beams at times t1, t2, and t3 that correspond to the lateral oscillation of the first portion 120 are indicated by reflected beams 127-1, 127-2, and 127-3, respectively, which indicate the second, reflected light path 127 that is directed to the detector array 126 via the receiving lens 144. The lateral oscillation of the first portion 120 indicated by the transmitted beams 125-1, 125-2, and 125-3 results in an increased resolution on the target 150 when reflected back to the detector array 126. Again, additional lenses, 45 degree transmitting mirrors, beam splitters and other such optical elements may be incorporated into the optical design.

Referring again to FIG. 3, the laser array 124 and the detector array 126 are oriented to longitudinally project and receive, respectively, laser light beams. Compression springs 134 are disposed on opposed lateral ends of the PCB 122. In one embodiment, the PCB 122 is disposed on the slide bearing 130, which is laterally oriented, thus enabling and restricting cyclic motion of the PCB 122 in parallel to the lateral axis 12. The position sensor 132 is disposed on the mounting frame 115 and monitors the lateral position of the PCB 122.

Figure 4:
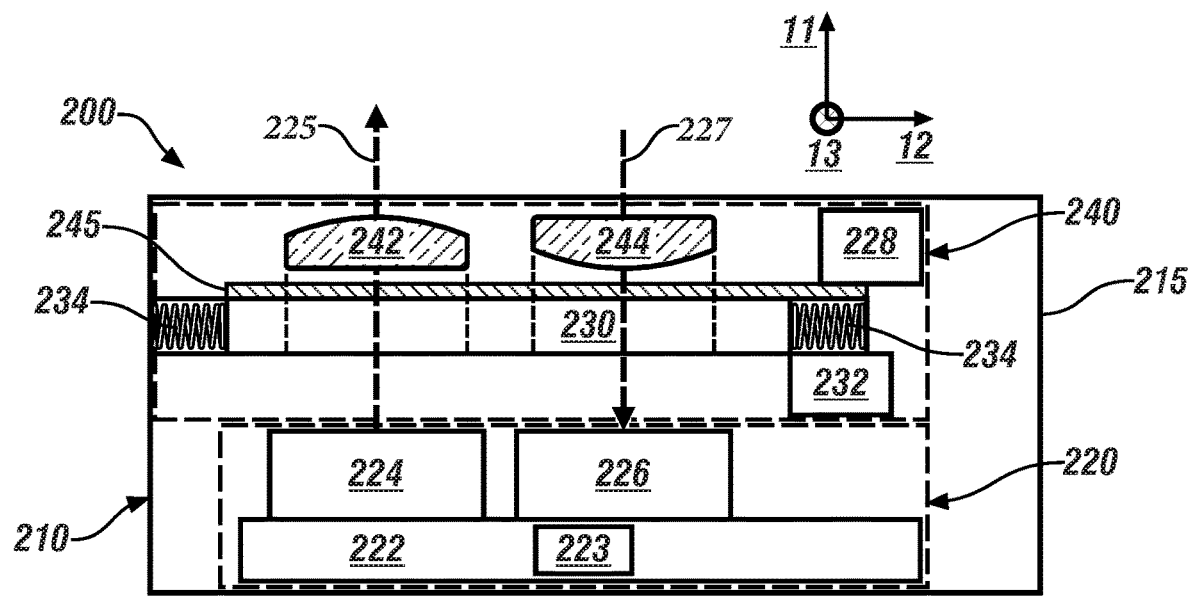
FIG. 4 schematically illustrates a top view of another embodiment of the LiDAR system, in accordance with the disclosure.

FIG. 4 shows a schematic top view of another embodiment of the LiDAR system 200, wherein orientation of the LiDAR system 200 is defined and described in context of the three-dimensional coordinate system including longitudinal axis 11, lateral axis 12 and attitudinal axis 13. The LiDAR system 200 includes lidar sensor 210 including first portion 220 and second portion 240, mounting frame 215, LRA 228, and LiDAR controller 223. The first portion 220 and second portion 240 are arranged in a manner that facilitates scanning by oscillating the second portion 240. In this embodiment, the first portion 220 is secured to the mounting frame 215, and the second portion 240 is arranged to oscillate in a manner described herein.

The first portion 220 includes a laser array 224 and a detector array 226, which are disposed on a printed circuit board (PCB) 222. The laser array 224 and the detector array 226 are oriented to longitudinally project and receive, respectively, laser light beams.

The second portion 240 includes a transmitting lens 242, a receiving lens 244, a lens mount 245, and a linear resonant actuator (LRA) 228. The transmitting lens 242 is disposed in a first light path 225 associated with transmitted light from the laser array 224 and the receiving lens 244 is disposed in a second light path 227 associated with reflected light that is directed to the detector array 226. The LiDAR controller 223 is disposed on the PCB 222 and provides operational control of the laser array and the LRA 228, and executes signal processing of the detector array 226. In one embodiment, the lens mount 245 including the transmitting lens 242 and the receiving lens 244 is disposed on a slide bearing 230, which is laterally oriented, thus enabling and restricting cyclic motion of the lens mount 245 in parallel to the lateral axis 12. A position sensor 232 is disposed on the mounting frame 215 and monitors the lateral position of the lens mount 245. The position sensor 232 is employed to measure translation of the lens mount 245 and thus the transmitting lens 242 and the receiving lens 244 during the oscillation, for open loop or closed loop operation to determine a position of a scan angle to build a point cloud.

Compression springs 234 are disposed on opposed lateral ends of the lens mount 245. The spring constants of the compression springs 234 are selected to achieve a preferred scan pattern for the LiDAR system 200. By way of example, a scan rate is related to resonant frequency, which is associated with the spring constant. Thus, a high spring constant can be selected to achieve a high resonant frequency to facilitate a high scan rate, whereas a low spring constant can be selected to achieve a low resonant frequency to facilitate a low scan rate. Alternatively, the alternating current signal can be employed to control the LRA 228 by controlling its scan rate.

This embodiment may facilitate operation of the LRA 228 at a higher oscillation frequency than the embodiment described with reference to FIG. 2 because the second portion 240 includes only the lens mount 245, the transmitting lens 242 and the receiving lens 244, which may be lower in mass than the first portion 220. Assembly of this embodiment may also be easier than the embodiment described with reference to FIG. 2. This embodiment may be relatively easy to assemble because the second portion 240 including the lenses has less mass than the first portion 220 including the laser array 224, the PCB 222, and the detector array 226, which facilitates higher oscillation frequency, and an associated scan rate and robust assembly. In operation, the LRA 228 causes the PCB 222 with the laser array 224 and the detector array 226 to oscillate laterally, with the oscillation being monitored by the position sensor 232.

Figure 5:
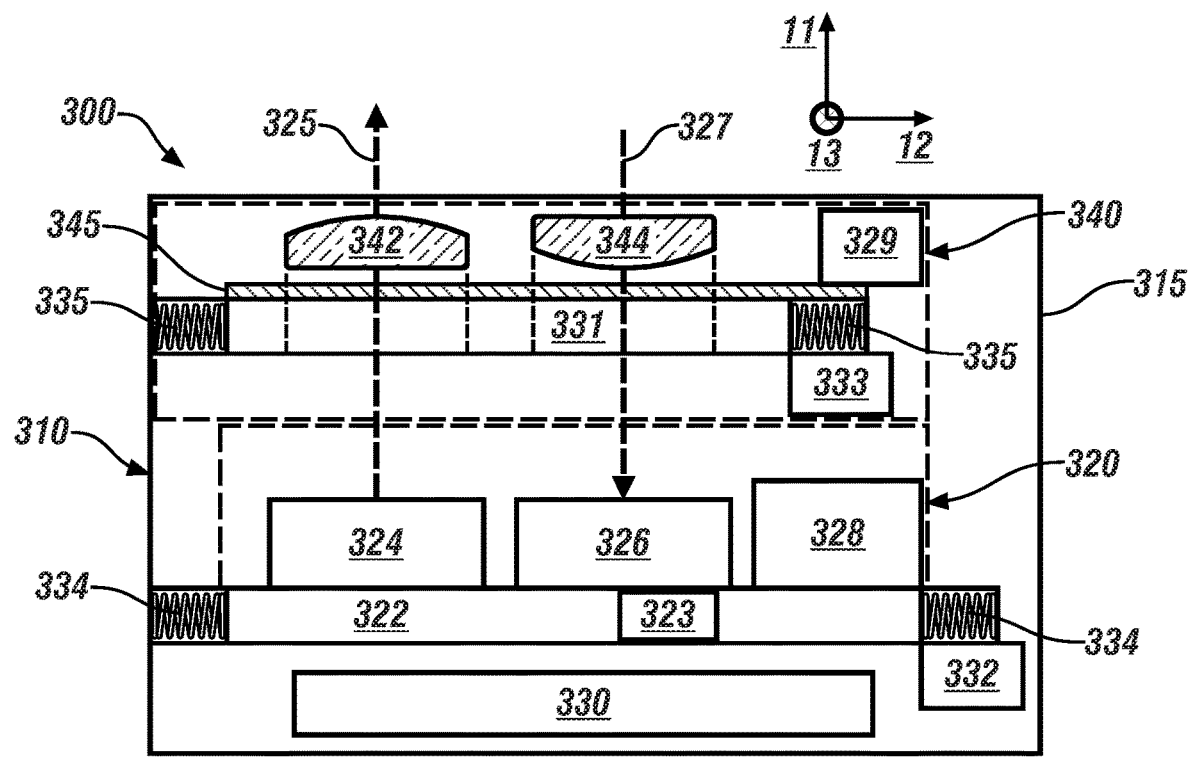
FIG. 5 schematically illustrates another embodiment of the LiDAR system, in accordance with the disclosure.

FIG. 5 shows a schematic top view of another embodiment of the LiDAR system 300, wherein orientation of the LiDAR system 300 is defined and described in context of the three-dimensional coordinate system including longitudinal axis 11, lateral axis 12, and attitudinal axis 13. The LiDAR system 300 includes lidar sensor 310 including a first portion 320 and a second portion 340, a mounting frame 315, first and second LRAs 328, 329, respectively, and LiDAR controller 323. The first portion 320 and the second portion 340 are arranged in a manner that facilitates scanning. In this embodiment, the first portion 320 is arranged to oscillate laterally by action of the first LRA 328, and the second portion 340 is arranged to oscillate attitudinally by action of the second LRA 329. Alternatively, the first portion 320 is arranged to oscillate attitudinally, and the second portion 340 is arranged to oscillate laterally. Two stage motion can be used to shift the lens relative to the laser/detector in both the y and x axis, allowing for a 2D scan, which may be in the form of a Lissajous scan pattern. Alternatively, the first portion 320 is held static, and the second portion 340 is arranged to oscillate both laterally and attitudinally.

The first portion 320 includes laser array 324, detector array 326, and first LRA 328, all of which are disposed on a printed circuit board (PCB) 322. The laser array 324 and the detector array 326 are oriented to longitudinally project and receive, respectively, laser light beams. First compression springs 334 are disposed on opposed lateral ends of the PCB 322. The spring constants of the first compression springs 334 are selected to achieve a preferred scan pattern for the LiDAR system 300. By way of example, a scan rate is related to resonant frequency, which is associated with the spring constant. Thus, a high spring constant can be selected to achieve a high resonant frequency to facilitate a high scan rate, whereas a low spring constant can be selected to achieve a low resonant frequency to facilitate a low scan rate. Alternatively, the alternating current signal can be employed to control the first LRA 328 by controlling its scan rate.

In one embodiment, the PCB 322 is disposed on a first slide bearing 330, which is laterally oriented, thus enabling and restricting cyclic motion of the PCB 322 in parallel to the lateral axis 12. A first position sensor 332 is disposed on the mounting frame 315 and monitors the lateral position of the PCB 322. The first position sensor 332 is employed to measure translation of the PCB 322 and thus the translation of the laser array 324 and the detector array 326 for open loop or closed loop operation.

The second portion 340 includes transmitting lens 342, receiving lens 344, lens mount 345, and second LRA 329. The transmitting lens 342 is disposed in a first light path 325 associated with transmitted light from the laser array 324 and the receiving lens 344 is disposed in a second light path 327 associated with reflected light that is directed to the detector array 326. In one embodiment, the lens mount 345 including the transmitting lens 342 and the receiving lens 344 is disposed on a second slide bearing 331, which is attitudinally oriented, thus enabling and restricting cyclic motion of the lens mount 345 in parallel to the attitudinal axis 13. A second position sensor 333 is disposed on the mounting frame 315 and monitors the attitudinal position of the lens mount 345. The first position sensor 332 is employed to measure translation of the lens mount 345 and thus the transmitting lens 342 and the receiving lens 344 for open loop or closed loop operation to determine a position of a scan angle. The LiDAR controller 323 is disposed on the PCB 322 and provides operational control of the laser array 324 and the first and second LRAs 328, 329, and executes signal processing of the detector array 326.

Second compression springs 335 are disposed on opposed attitudinal ends of the lens mount 345. The spring constants of the second compression springs 335 are selected to achieve a preferred scan pattern for the LiDAR system 300. By way of example, a scan rate is related to resonant frequency, which is associated with the spring constant. Thus, a high spring constant can be selected to achieve a high resonant frequency to facilitate a high scan rate, whereas a low spring constant can be selected to achieve a low resonant frequency to facilitate a low scan rate. Alternatively, the alternating current signal can be employed to control the second LRA 329 by controlling its scanning frequency.

Implementation of an embodiment of the LiDAR system described herein includes designing a printed circuit board for a laser/detector system to incorporate a linear resonant actuator, and designing the optics, i.e., lenses, to steer the laser/detectors with linear translation. The linear resonant actuator oscillates the printed circuit board including the laser/detector system, a slide bearing, or a rail, relative to the lenses. The linear resonant actuator is aligned to generate a lateral force to move the printed circuit board. Furthermore, the printed circuit board has a pre-loaded zero starting point. The linear resonant actuator is controlled via a signal that is matched to a material resonance frequency, and the position of the printed circuit board is monitored for correlation or synchronization and closed loop operation.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A light detection and ranging (LiDAR) system arranged to monitor a field of view, comprising:
   a LiDAR sensor including a first portion including a laser array and a detector array, and a second portion including a transmitting lens and a receiving lens; and
   a linear resonant actuator;
   wherein the linear resonant actuator includes a first linear resonant actuator and a second linear resonant actuator;
   wherein the first linear resonant actuator is arranged to oscillate the first portion including the laser array and the detector array of the LiDAR sensor in a lateral direction; and
   wherein the second linear resonant actuator is arranged to oscillate the second portion including the transmitting lens and the receiving lens in an attitudinal direction.

2. The system of claim 1, wherein the linear resonant actuator is arranged to mechanically laterally oscillate one of the first portion or the second portion of the LiDAR sensor.

3. The system of claim 2, wherein the linear resonant actuator is arranged to mechanically laterally oscillate the first portion of the LiDAR sensor including the laser array and the detector array.

4. The system of claim 3, further comprising a mounting frame and a position sensor, wherein the position sensor is arranged to monitor a lateral position of the first portion of the LiDAR sensor in relation to the mounting frame.

5. The system of claim 2, wherein the linear resonant actuator is arranged to mechanically laterally oscillate the second portion of the LiDAR sensor including the transmitting lens and the receiving lens.

6. The system of claim 5, further comprising a mounting frame and a position sensor, wherein the position sensor is arranged to monitor a lateral position of the second portion of the LiDAR sensor in relation to the mounting frame.

7. The system of claim 1, further comprising a slide bearing, wherein the one of the first portion or the second portion of the LiDAR sensor is disposed on the slide bearing.

8. The system of claim 1, wherein the LiDAR sensor is arranged to monitor the field of view in a longitudinal direction and an attitudinal direction proximal to the LiDAR sensor; and wherein the linear resonant actuator is arranged to mechanically oscillate one of the first portion or the second portion of the LiDAR sensor in a lateral direction that is orthogonal to the longitudinal direction and the attitudinal direction.

9. The system of claim 1, wherein the LiDAR sensor is arranged to monitor the field of view in a longitudinal direction and an attitudinal direction; and wherein the resonant actuator is arranged to oscillate the first portion of the LiDAR sensor in a lateral direction and an attitudinal direction.

10. A vehicle system, comprising:
a light detection and ranging (LiDAR) sensor arranged to monitor a field of view proximal to the vehicle, wherein the LiDAR sensor includes a first portion including a laser array and a detector array, and a second portion including a transmitting lens and a receiving lens;
a mounting frame;
a linear resonant actuator; and
a linear micromotion slide device;
wherein one of the first portion or the second portion of the LiDAR sensor is disposed on the linear micromotion slide device;
wherein the linear resonant actuator includes a first linear resonant actuator and a second linear resonant actuator;
wherein the first linear resonant actuator is arranged to oscillate the first portion including the laser array and the detector array of the LiDAR sensor in a lateral direction; and
wherein the second linear resonant actuator is arranged to oscillate the second portion including the transmitting lens and the receiving lens in an attitudinal direction.

11. The system of claim 10, wherein the first portion of the LiDAR sensor including the laser array and the detector array is disposed on the linear micromotion slide device, and wherein the linear resonant actuator is arranged to mechanically oscillate the first portion of the LiDAR sensor including the laser array and the detector array.

12. The system of claim 10, wherein the second portion of the LiDAR sensor including the transmitting lens and the receiving lens is disposed on the linear micromotion slide device, and wherein the linear resonant actuator is arranged to mechanically oscillate the second portion of the LiDAR sensor including the transmitting lens and the receiving lens.

13. The system of claim 10, wherein the LiDAR sensor is arranged to monitor the field of view in a longitudinal direction and an attitudinal direction proximal to the LiDAR sensor; and wherein the linear resonant actuator is arranged to mechanically oscillate one of the first portion or the second portion of the LiDAR sensor in a lateral direction that is orthogonal to the longitudinal direction and the attitudinal direction.

14. The system of claim 10, wherein the light detection and ranging (LiDAR) sensor arranged to monitor a field of view proximal to the vehicle comprises the LiDAR sensor arranged to monitor the field of view that is forward of the vehicle.

15. A light detection and ranging (LiDAR) system arranged to monitor a field of view, comprising:
a LiDAR sensor including a first portion including a single laser and a single detector, and a second portion including a transmitting lens and a receiving lens; and
a linear resonant actuator;
wherein the linear resonant actuator includes a first linear resonant actuator and a second linear resonant actuator;
wherein the first linear resonant actuator is arranged to oscillate the first portion including the laser array and the detector array of the LiDAR sensor in a lateral direction; and
wherein the second linear resonant actuator is arranged to oscillate the second portion including the transmitting lens and the receiving lens in an attitudinal direction.

16. The LiDAR system of claim 15, wherein the linear resonant actuator is arranged to mechanically laterally oscillate the first portion of the LiDAR sensor including the single laser and the single detector.

17. The LiDAR system of claim 15, wherein the linear resonant actuator is arranged to mechanically laterally oscillate the second portion of the LiDAR sensor including the transmitting lens and the receiving lens.

18. The LiDAR system of claim 15, wherein the LiDAR sensor is arranged to monitor the field of view in a longitudinal direction and an attitudinal direction proximal to the LiDAR sensor; and wherein the linear resonant actuator is arranged to mechanically oscillate one of the first portion or the second portion of the LiDAR sensor in a lateral direction that is orthogonal to the longitudinal direction and the attitudinal direction.

* * * * *